April 2, 1940.   M. W. BOWEN   2,195,558
HYDRAULIC BRAKE SYSTEM
Filed Feb. 20, 1936   5 Sheets-Sheet 2

INVENTOR.
MYRON W. BOWEN
BY
Williams, Bradbury, McCaleb & Hinkle
ATTORNEYS.

April 2, 1940.                M. W. BOWEN                2,195,558
HYDRAULIC BRAKE SYSTEM
Filed Feb. 20, 1936          5 Sheets-Sheet 4

INVENTOR.
MYRON W. BOWEN
BY Williams, Bradbury,
McCaleb & Hinkle.
ATTORNEYS.

April 2, 1940.   M. W. BOWEN   2,195,558
HYDRAULIC BRAKE SYSTEM
Filed Feb. 20, 1936   5 Sheets-Sheet 5

INVENTOR.
MYRON W. BOWEN
BY Williams, Bradbury,
McCaleb & Hinkle ATTORNEYS.

Patented Apr. 2, 1940

2,195,558

UNITED STATES PATENT OFFICE 2,195,558

HYDRAULIC BRAKE SYSTEM

Myron W. Bowen, Detroit, Mich., assignor to Hydraulic Brake Company, Detroit, Mich., a corporation of California Application February 20, 1936, Serial No. 64,929

9 Claims. (Cl. 188—152)

This invention relates to fluid pressure braking systems for motor vehicles.

Broadly the invention comprehends a fluid pressure braking system including a pressure producing device, operating means therefor, fluid pressure motors operatively connected to the device, friction elements actuated by the motors, a separate fluid pressure system including a pressure producing device operatively connected to the motors, and independent means for operating the separate fluid pressure system.

An object of the invention is to provide a braking system for a motor vehicle including two separate fluid pressure braking systems having in common the fluid pressure actuated motors associated with the brake structures of the vehicle.

Another object of the invention is to provide a braking system for a motor vehicle including a fluid pressure system for actuating the service brakes of the vehicle, and a separate or emergency fluid pressure system for actuating the same brakes.

Another object of the invention is to provide a braking system including a duplex fluid pressure actuated motor for actuating the friction elements of the brakes, and two separate operating means for the motor.

Other objects of the invention will appear from the following description taken in connection with the drawings which form a part of this specification, and in which.

Figure 1:
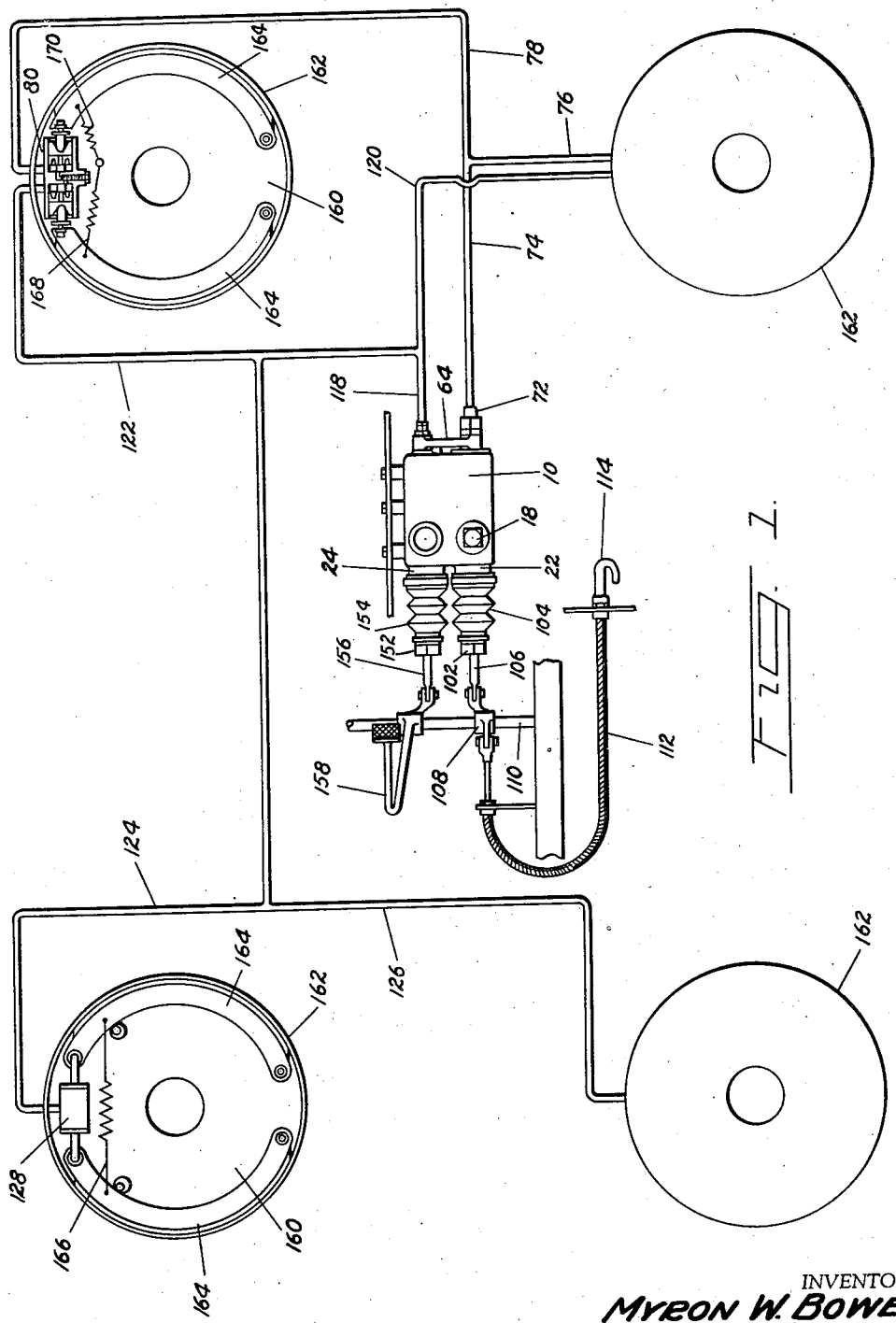
Fig. 1 is a schematic view of a fluid pressure braking system embodying the invention.
Figure 2:
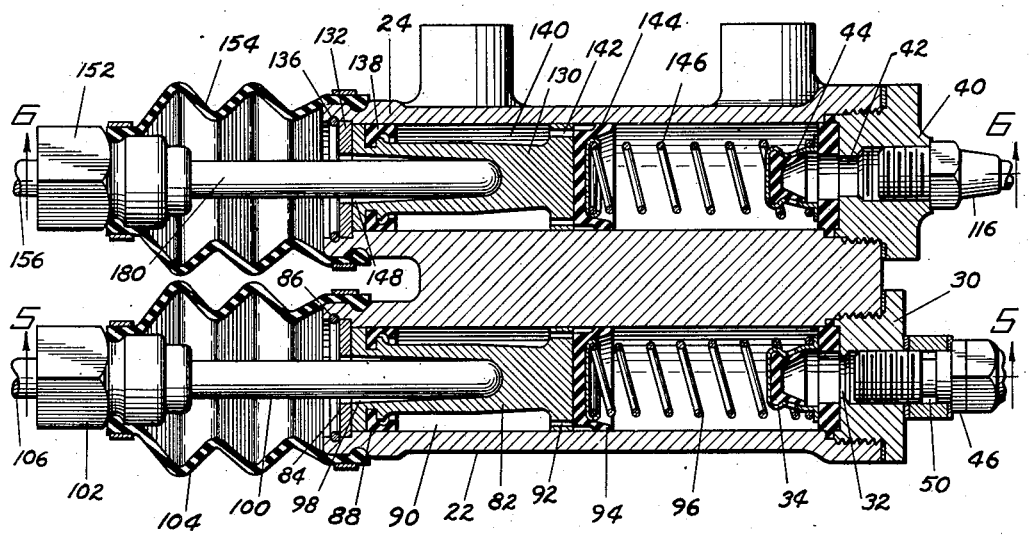
Fig. 2 is a longitudinal sectional view of the fluid pressure producing device.
Figure 3:
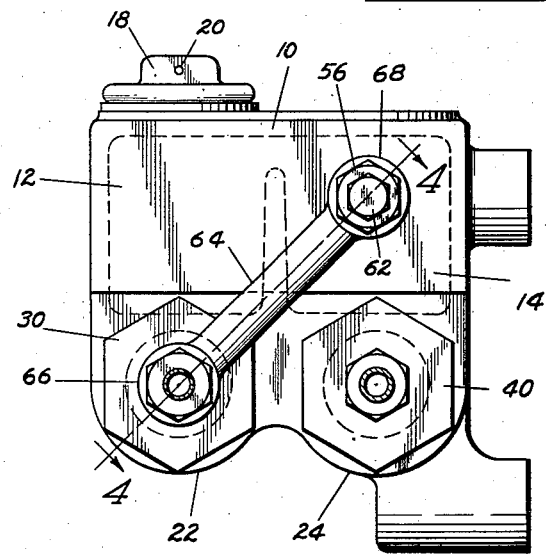
Fig. 3 is an end elevation of the fluid pressure producing device.
Figure 4:
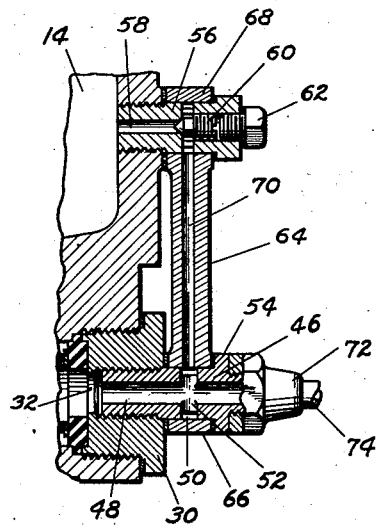
Fig. 4 is a sectional view substantially on line 4—4, Fig. 3.
Figure 5:
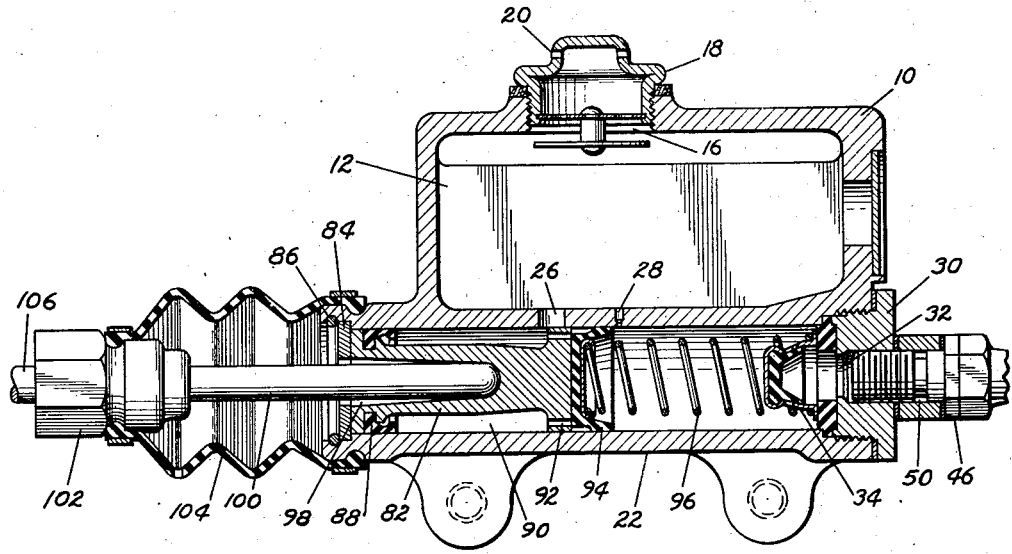
Fig. 5 is a sectional view substantially on line 5—5, Fig. 2.
Figure 6:
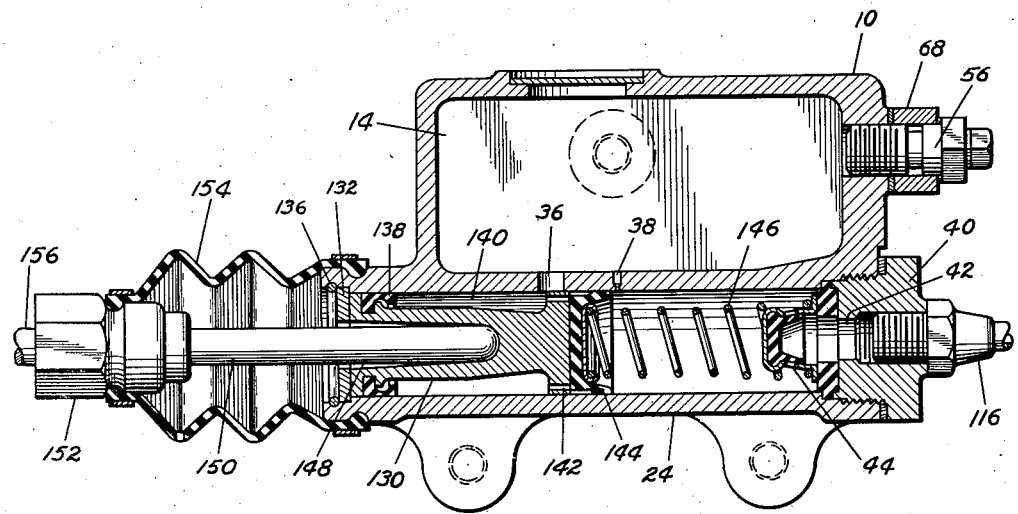
Fig. 6 is a sectional view substantially on line 6—6, Fig. 2.
Figure 7:
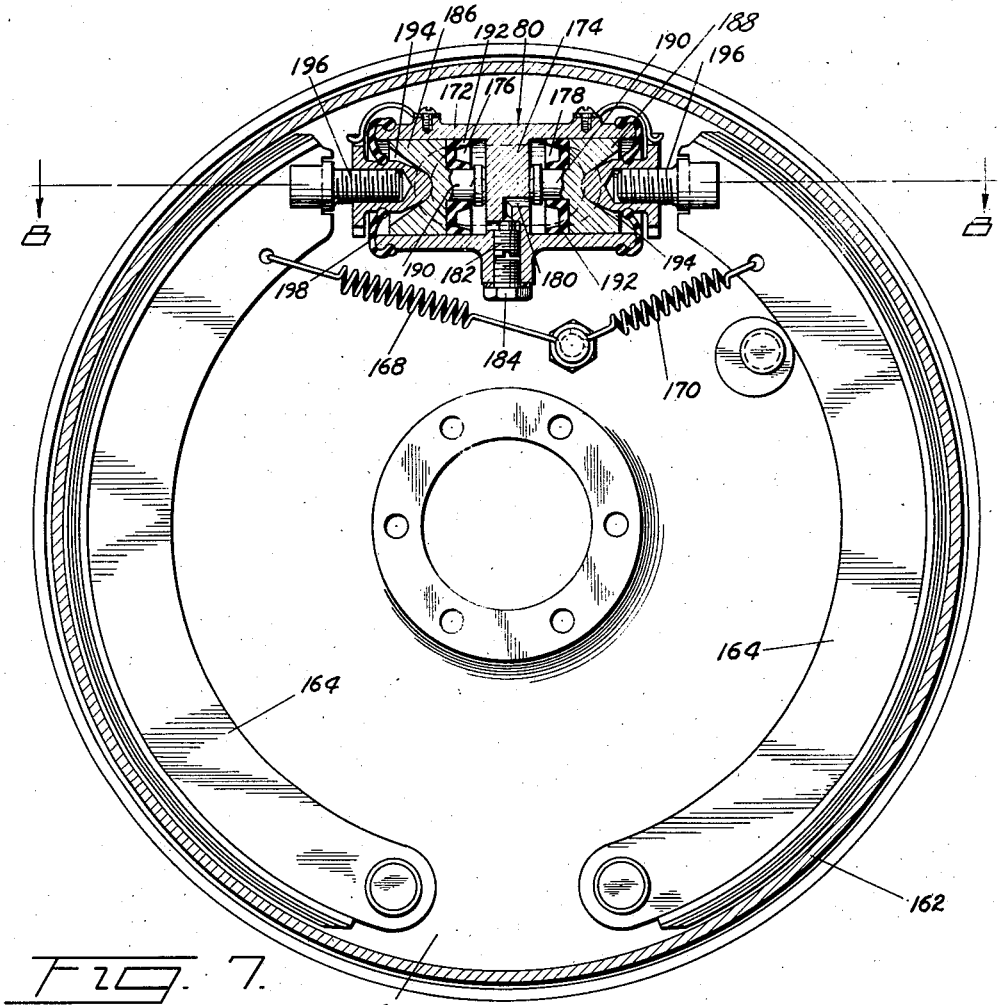
Fig. 7 is a vertical sectional view of a brake structure illustrating the fluid pressure actuated motor in section.
Figure 8:
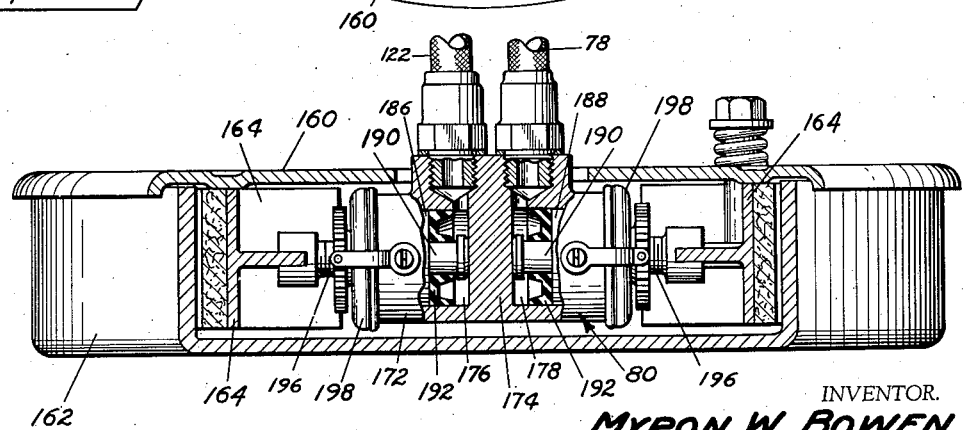
Fig. 8 is a sectional view substantially on line 8—8, Fig. 7.

Referring to the drawings for more specific details of the invention, 10 represents a fluid reservoir having two compartments 12 and 14 and a filling opening 16 closed as by a plug 18 having openings 20 for venting the reservoir to the atmosphere. Arranged in parallel relation to one another at the base of the reservoir are two corresponding cylinders 22 and 24. The cylinder 22 has ports 26 and 28, providing communications between the cylinder and the compartment 12 of the reservoir, and a head 30 having a concentric bore providing a discharge port 32 for the cylinder preferably controlled as by a two-way valve 34. Correspondingly, the cylinder 24 has ports 36 and 38, providing communications between the cylinder and the compartment 14 of the reservoir, and a head 40 having a concentric bore providing a discharge port 42 for the cylinder preferably controlled as by a two-way valve 44.

A plug 46 threaded in the discharge port 32 has an axial passage 48, a circumferential groove 50, a plurality of diametral openings 52 providing communications between the axial passage and the groove, and a radial flange 54. A similar plug 56, threaded into an opening in the wall of the reservoir above the fluid level, has an axial passage 58 controlled by a screw 60 concealed within the plug by a removable stud 62 threaded in the open end of the plug; and a connection 64 having sleeves 66 and 68 on its respective ends fitted respectively on the plugs 46 and 56 has a passage 70 providing a communication between the circumferential grooves in the plugs. The purpose of this structure is to provide means for bleeding the system, as will hereinafter more fully appear.

A coupling 72 connects the plug 46 to a fluid pressure delivery pipe 74 having branches 76 and 78 connected respectively to duplex fluid pressure actuated motors 80 arranged for actuating the friction elements of brakes associated with the rear wheels of the vehicle.

A piston 82, reciprocable in the cylinder 22, is retained against displacement by a washer 84 seated on an annular shoulder in the open end of the cylinder and held in place by a retaining ring 86 seated in a circumferential groove in the wall of the cylinder. The skirt of the piston carries a leak-proof washer 88, of a suitable type, to provide against seepage of fluid from the cylinder past the piston. The body of the piston is reduced in diameter to provide in conjunction with the wall of the cylinder an annular chamber 90 communicating with the compartment 12 of the reservoir by way of the port 28, and the head of the piston has a plurality of spaced ports 92 providing communications between the annular chamber 90 and that portion of the cylinder forward of the piston. A collapsible leak-proof cup 94 on the head of the piston controls the ports 92, and a spring 96 interposed between the cup 94 and the two-way valve 34 serves to retain these elements against displacement and also to return the piston to its retracted position.

In the back of the piston is a recess 98 for the reception of one end of a thrust rod 100, on the other end of which is a coupling 102 connected by a flexible boot 104 to the open end of the cylinder for exclusion from the cylinder of dust and other foreign substances. The coupling 102 is connected by a rod 106 to one end of a rocker arm or lever 108 journaled on a fixed support 110, and the other end of the lever 108 is connected by a Bowden wire 112 to a handle or pull 114.

A coupling 116 threaded in the discharge port 42 of the cylinder 24 connects a fluid pressure delivery pipe or conduit 118 having branches 120 and 122, connected respectively to the duplex fluid pressure actuated motor 80 for actuating the friction elements of the brakes associated with the rear wheels of the vehicle, and branches 124 and 126 connected respectively to fluid pressure actuated motors 128 arranged for actuating the brakes associated with the front wheels of the vehicle.

A piston 130 reciprocable in the cylinder 24 is retained against displacement by a washer 132 seated on an annular shoulder in the open end of the cylinder and held in place by a retaining ring 136 seated in a continuous groove in the wall of the cylinder. The skirt of the piston carries a leak-proof washer 138 of a type suitable to adequately provide against seepage of fluid from the cylinder past the piston. The body of the piston is reduced to provide in conjunction with the wall of the cylinder an annular chamber 140 communicating with the compartment 14 of the reservoir by way of the port 36, and the head of the piston has a plurality of ports 142 providing communications between the annular chamber 140 and that portion of the cylinder 24 forward of the piston.

A leak-proof cup 144 on the head of the piston controls the ports 142, and a spring 146 interposed between the cup 144 and the two-way valve 44 serves to retain these elements against displacement and also to return the piston 130 to its retracted position. The piston 130 has in its back a recess 148. This recess receives one end of a thrust rod 150, on the other end of which is a coupling 152 connected as by a flexible boot 154 to the open end of the cylinder 24 for excluding from the cylinder dust and other foreign substances. A rod 156 connects the coupling 152 to a foot pedal lever 158 journaled on the support 110. The pedal is biased towards its normal position in known manner.

The brakes may be of conventional type including a fixed support or backing plate 160, a rotatable drum 162 associated therewith, corresponding friction elements or shoes 164 pivoted on the backing plate, and a fluid pressure actuated motor corresponding to the duplex motors 80, or the motors 128, mounted on the backing plate and operative to move the shoes into engagement with the drum against the resistance of a retractile spring 166, or a pair of retractile springs 168 and 170 of different tensions so that the forward friction element may engage the drum in advance of the trailing friction element.

The duplex fluid pressure actuated motors 80 each include a floating cylinder 172 having a central wall 174 dividing the cylinder into two corresponding chambers 176 and 178. The wall 174 has a passage 180 providing communications between the chambers, and a bleeder screw 182 mounted in the wall of the cylinder and concealed by a plug 184 controls the passage. The chamber 176 is connected to one of the branches of the fluid pressure delivery pipe or conduit 118, and the chamber 178 is connected to one of the branches of fluid pressure delivery pipe or conduit 74. Pistons 186 and 188, reciprocable respectively in the respective chambers, have on their respective heads stops 190, normally seated on the wall, and leak-proof cups 192 seated on the heads of the respective cylinders are sleeved over the stops. The pistons have in their backs recesses 194 for the reception of one end of an adjustable thrust rod 196, the other end of which engages the friction element 164, and connected between the adjustable thrust rod 196 and the open end of the cylinder is a shield 198 for the exclusion of dust and other foreign substances from the cylinder.

Figure 9:
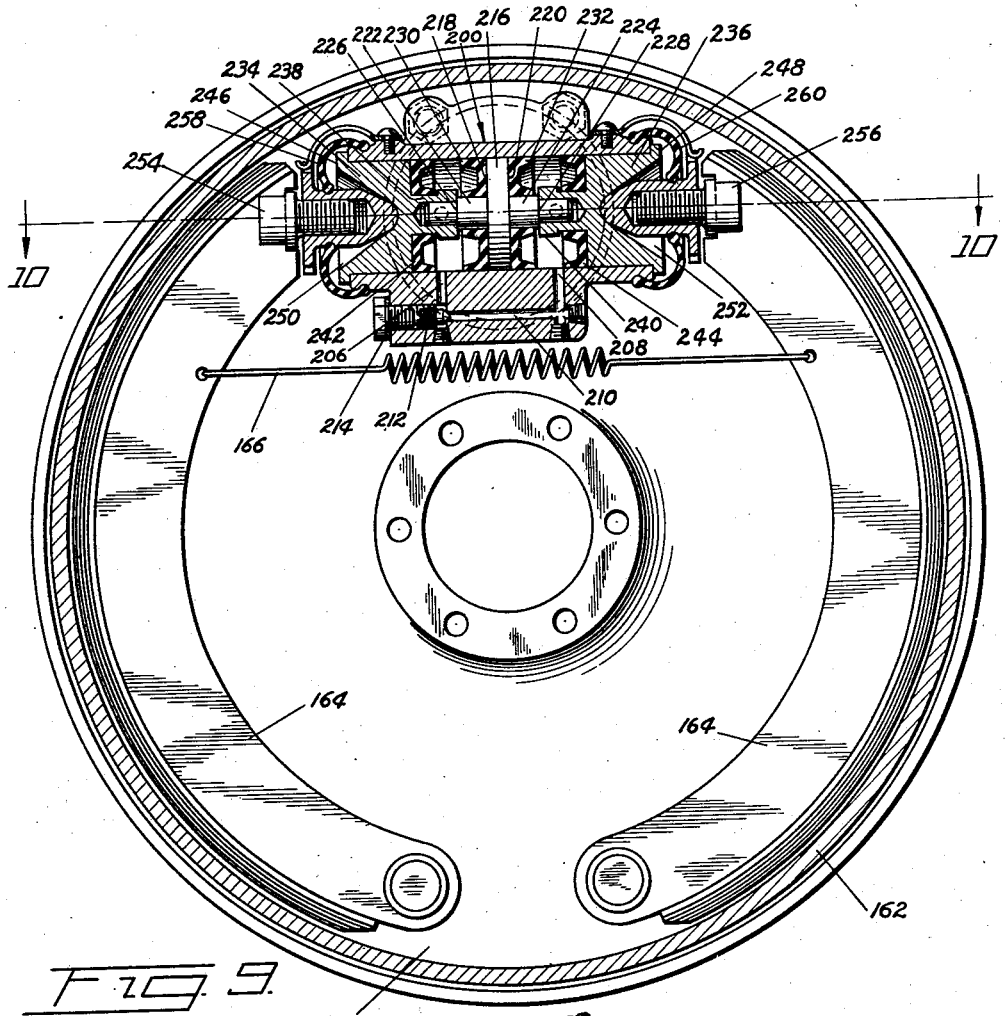
Fig. 9 is a vertical sectional view of a brake structure illustrating in section a modification of the fluid pressure actuated motor.
Figure 10:
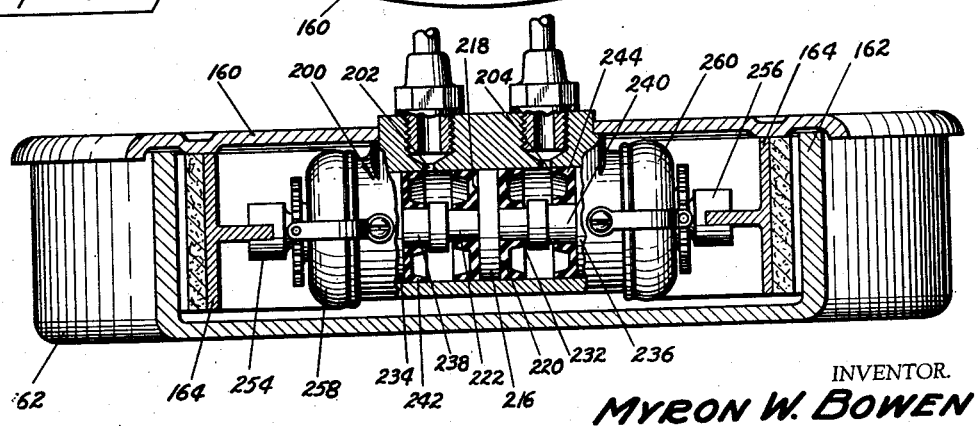
Fig. 10 is a sectional view substantially on line 10—10, Fig. 9.

A modification of the duplex fluid pressure actuated motor is illustrated in Figs. 9 and 10. In this modification of the motor a cylinder 200, suitably secured to the backing plate 160 between the separable ends of the friction elements 164, has spaced inlet ports 202 and 204 and also spaced ports 206 and 208 connected by a passage 210 controlled by a bleeder screw 212 concealed by a plug 214.

A piston 216 reciprocable in the cylinder between the spaced ports has oppositely disposed heads 218 and 220 having concentric double diametral extensions 222 and 224 providing opposed shoulders 226 and 228, and leak-proof cups 230 and 232 sleeved over the extensions are seated on the heads. Opposed pistons 234 and 236, reciprocable in the respective ends of the cylinder, have on their respective heads extensions 238 and 240, respectively, and sleeved on the extensions 238 and 240 are leakproof cups 242 and 244. The free ends of the extensions 238 and 240 normally abut the shoulders 226 and 228, and the pistons 234 and 236 have flanges 246 and 248 adapted to engage the respective ends of the cylinders for limiting movement of the pistons in one direction. Recesses 250 and 252 in the backs of the pistons receive adjustable thrust pins 254 and 256 suitably connected to the respective friction elements 164, and shields 258 and 260 are connected between the thrust pins and the open ends of the cylinder for the exclusion of dust and other foreign substances.

Under normal operating conditions of the system, in applying the service brakes of the vehicle the operator depresses the foot pedal lever 158. Upon this movement of the foot pedal lever, force is transmitted therefrom through the rod 156 and thrust pin 150 to the piston 130, resulting in moving the piston on its compression stroke. This movement of the piston displaces fluid from the cylinder 24 past the two-way valve 44, through the discharge port 42 and the fluid pressure delivery pipe 118 and its branches 120, 122, 124 and 126 into the fluid pressure actuated motors 80 and 128, causing actuation of the motors with the resultant movement of the friction elements 164 against the resistance of the retractile springs 166, or 168 and 170, into engagement with the drum.

Upon release of the foot pedal lever 158, the lever is returned to its normal position under the influence of a retractile spring, not shown. This movement of the lever retracts the rod 156 and thrust pin 150, resulting in release of the piston. Upon release of the piston, the spring 146 becomes effective to return the piston to its retracted position. As the piston returns to its retracted position a vacuum is created in that portion of the cylinder forward of the piston, resulting in drawing fluid from the compartment 14 of the reservoir, through the port 36, into the annular chamber 140, thence through the ports 142 in the head of the piston, past the collapsible leak-proof cup 144 into that portion of the cylinder forward of the piston.

During this period fluid is returned to the cylinder 24 from the fluid pressure actuated motors 80 and 128 under the influence of the retractile springs connecting the friction elements 164 to the respective brakes of the structure. The quantity of fluid received by the cylinder may be in excess of the quantity required to completely fill the cylinder, and in that event any fluid in excess of the quantity required is returned to the compartment 14 of the reservoir by way of the port 38.

When it is desired to apply the emergency brake, the operator pulls on the handle 114, and this force is transmitted from the handle 114, through the Bowden wire 112, the lever 108, the rod 106, and the thrust pin 100 to the piston 82, resulting in moving the piston on its compression stroke. This movement of the piston displaces fluid from the cylinder 22, past the two-way valve 34, through the discharge port 32, the fluid pressure delivery pipe 74 and its branches 76 and 78, into the fluid pressure actuated motors 80, causing actuation of the motors with the resultant movement of the friction elements 164 against the resistance of retractile springs 168 and 170 into engagement with the drum 162.

Upon release of the handle 114, the lever 108, the rod 106, and the thrust pin 100 return to their retracted positions due to the characteristics of the Bowden wire 112 connected between the handle 114 and the lever 108. This results in releasing the piston 82, whereupon the piston is returned to its retracted position under the influence of the spring 96. As the piston returns to its retracted position, a vacuum is created in the cylinder 22 forward of the piston, resulting in drawing fluid from the compartment 12 of the reservoir, through the port 26, into the annular chamber 90, thence through the ports 92 in the head of the piston, past the leak-proof cup 94, into that portion of the cylinder forward of the piston. During this period fluid is returned to the cylinder from the fluid pressure actuated motors 80 under the influence of retractile springs 168 and 170. The quantity of fluid received by the cylinder 22 may be in excess of the quantity required to completely fill the cylinder, and in that event the excess fluid is returned to the compartment 12 of the reservoir by way of the port 28.

When it is desired to bleed the system for the purpose of removing any air or gas which may accumulate therein, the brake structures are adjusted by backing the bleeder screws 182 or 212, as the case may be, off their seats so as to establish communication between the chambers 176 and 178 of the motors 80, or to establish communication between the respective heads of the pistons 216 in the cylinder 200. The bleeder screw 60 is also backed off of its seat so as to establish communication between the fluid pressure delivery pipe 74 and the reservoir.

After making these adjustments, the foot pedal lever is repeatedly actuated so as to cause a continuous circulation of fluid from the reservoir through the cylinder 24, fluid pressure delivery pipe 118 and its branches 120 and 122, the motors 80 or the cylinder 200, as the case may be, the fluid pressure delivery pipe 74 and its branches 76 and 78, and the passage 70 back to the reservoir. When the system is solidly filled with liquid the bleeder screws are turned down on their seats and the system is again ready for use.

The expression "duplex fluid pressure motor" is used in the appended claims to describe a motor having a multiplicity of fluid pressure actuating chambers.

Although this invention has been described in connection with certain specific embodiments, the principles involved are susceptible of numerous other applications that will readily occur to persons skilled in the art. The invention is, therefore, to be limited only as indicated by the scope of the appended claims.

Having thus described the various features of the invention, what I claim as new and desire to secure by Letters Patent is:

1. A braking system for a motor vehicle comprising a pair of brakes for the front wheels of the vehicle, a pair of brakes for the rear wheels of the vehicle, a fluid pressure system for actuating both pairs of brakes, a separate fluid pressure system for actuating only one pair of brakes, and means to establish a connection between the two said systems.

2. A braking system for motor vehicles comprising a pair of brakes for the front wheels of the vehicle, a pair of brakes for the rear wheels of the vehicle, a fluid pressure system for actuating both pairs of brakes, a separate fluid pressure system for actuating the brakes for the rear wheels of the vehicle, and means to bleed one of said systems through the other.

3. A fluid pressure system comprising a fluid pressure producing device, a pair of fluid pressure actuated motors operatively connected thereto, a pair of duplex fluid pressure motors operatively connected to the device, a separate fluid pressure producing device operatively connected to the duplex fluid pressure actuated motors, and means to interconnect both sides of the duplex fluid pressure motors.

4. A braking system comprising a fluid pressure producing device, a pair of fluid pressure actuated motors operatively connected thereto, friction elements actuated by the motors, a pair of duplex fluid pressure actuated motors operatively connected to the device, friction elements actuated thereby, and a separate fluid pressure producing device operatively connected to the duplex fluid pressure actuated motors.

5. A braking system comprising a fluid pressure producing device, a pair of fluid pressure actuated motors operatively connected thereto, friction elements actuated by the motors, a pair of floating duplex fluid pressure actuated motors operatively connected to the device, friction elements actuated thereby, and a separate fluid pressure producing device operatively connected to the floating duplex fluid pressure actuated motors.

6. A fluid pressure system comprising a reservoir having two compartments, a pair of pressure producing devices each communicating with a different compartment, a pair of opposed fluid pressure actuated motors, a controlled passage connecting the motors, fluid pressure delivery pipes connecting the respective motors, and a controlled passage connecting one of the fluid pressure delivery pipes to the reservoir.

7. A fluid pressure braking system comprising a reservoir having two compartments, a pressure producing device communicating with one of the compartments, a second pressure producing device communicating with the other compartment, a pair of fluid pressure actuated motors, a controlled passage connecting the motors, fluid pressure delivery pipes connecting the respective motors to the respective fluid pressure producing devices, and a controlled passage connecting one of the fluid pressure delivery pipes to the reservoir.

8. A fluid pressure braking system comprising a reservoir having two compartments, a pair of fluid pressure producing devices, one connected to each compartment, duplex fluid pressure actuated motors operatively connected to each of the fluid pressure producing devices, a controlled passage connecting the chambers of the fluid pressure actuated motors, friction elements actuated by each duplex fluid pressure actuated motor, a controlled passage connecting the discharge port of one of the fluid pressure producing devices with the reservoir, and separate operating means for each fluid pressure producing device.

9. A braking system comprising a fluid pressure producing device, a pair of fluid pressure actuated motors operatively connected thereto, friction elements actuated by the motors, a pair of cylinders connected to the device, opposed pistons reciprocable in the cylinders, a floating piston positioned substantially midway between the opposed pistons and having parts slidably engaging and abutting the pistons, and friction elements adapted to be actuated by the movement of the opposed pistons, and a separate fluid pressure producing device connected to said cylinders.

MYRON W. BOWEN.